(12) United States Patent
Takahashi et al.

(10) Patent No.: US 6,430,351 B1
(45) Date of Patent: Aug. 6, 2002

(54) V-SHAPED GROOVE BLOCK FOR AN OPTICAL FIBER

(75) Inventors: Kenji Takahashi; Masato Omori; Junichi Suzuki; Taku Otani; Fuminori Iijima, all of Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 09/538,150

(22) Filed: Mar. 29, 2000

(30) Foreign Application Priority Data

Mar. 31, 1999 (JP) .......................................... 11-090381

(51) Int. Cl.[7] ................................................. G02B 6/00
(52) U.S. Cl. ............................ 385/137; 385/83; 385/65
(58) Field of Search ........................... 385/14, 137, 83, 385/65, 55, 70, 76, 95, 97, 99, 134, 136

(56) References Cited

U.S. PATENT DOCUMENTS

| 4,749,252 | A | * | 6/1988 | Yanagi et al. ................. 385/85 |
| 4,788,406 | A | * | 11/1988 | Holman et al. .............. 219/113 |
| 5,042,895 | A | * | 8/1991 | Chouinard et al. ............ 385/2 |
| 5,533,158 | A | * | 7/1996 | Han et al. .................... 385/126 |
| 5,970,200 | A | * | 10/1999 | Takikawa et al. ........... 385/137 |
| 6,205,264 | B1 | * | 3/2001 | Jin et al. ....................... 385/14 |

FOREIGN PATENT DOCUMENTS

JP          5-75083         10/1993

\* cited by examiner

Primary Examiner—Cassandra Spyrou
Assistant Examiner—Euncha Cherry

(57) ABSTRACT

An object of the invention of the present application is to provide a V-shaped groove block for an optical fiber which has a simple structure, and can high strength fusion splice between optical fibers; in order to achieve the object, the present invention provide a V-shaped groove block for optical fibers for aligning and positioning the axis of naked optical fibers, wherein a thin film comprising a material that will not damage the naked optical fiber even when they are slid thereon, is provided on a surface of a V-shaped groove.

8 Claims, 2 Drawing Sheets

PRIOR ART

V-SHAPED GROOVE BLOCK FOR AN OPTICAL FIBER

BACKGROUND OF THE INVENTION

1. Field of the Invention

The present invention is related to a V-shaped block providing a V-shaped groove, in which single core or multiple core optical fibers are accommodated and anchored for positioning, used in a high strength fusing splice method.

2. Description of the Related Art

The V-shaped groove block is used in fusion splice and butt splice of optical fibers, and is most commonly used as a positioning groove for optical fibers.

A high strength fusion splice method for an optical fiber using a V-shaped groove block widely employed conventionally will be explained using FIG. 3~FIG. 5. Moreover, high strength fusion splice denotes a splice whose fusion part is difficult to break. FIG. 3 is a planar drawing for explaining the conventional high strength fusion splice method, FIG. 4 is a side view drawing, and FIG. 5 is a cross-sectional drawing along the line C—C in FIG. 4. In addition, in the drawings, reference numeral 10 is a V-shaped groove provided in the V-shaped groove block, 12 is the V-shaped groove block, 20 is the optical fiber core wire, 22 is the covered part, 24 is the naked optical fiber made of glass, for example, and 30 is an electrode.

Conventionally, in the high strength fusion splice of optical fibers, first, the covered part 22 of the optical fiber core wire 20 is mounted on the V-shaped groove 10 of the V-shaped groove block 12 so as not to damage the naked optical fiber 24, and the optical fiber core wire 20 is grasped by a clamp (not shown). Next, the clamp is moved, the covered part 22 slides into the V-shaped groove 10, and the ends of the two naked optical fibers 24, 24 to be fusion connected are brought together. Next, the ends of the naked optical fibers 24, 24 are maintained opposite each other, the ends are fused by an aerial discharge, and they are integrally connected.

However, there are the following problems in the high strength fusion splice method wherein the optical fiber core wire 20 having a covered part 22 is mounted on the V-shaped groove 10.

1. The surface of the V-shaped groove 10 is made of ceramic, etc., and the covered part 22 is formed by a heat resistant resin, etc. Therefore, because the sliding resistance (friction coefficient) between the covered part 22 and the V-shaped groove 10 surface is high, the optical fiber core wire 20 may be dislocated. In particular, when fixed polarization optical fibers are in the high strength fusion splice, in order to align the polarization faces, it is necessary to rotate the optical fiber core wires 20. Due to this rotation, separation and curl of the covered part 22 occurs, and frequently the optical fiber core wire 20 becomes dislocated in the V-shaped groove 10. Because of this, it becomes difficult to move the optical fiber core wire 20 to a pre-determined position by sliding it in the V-shaped groove 10. In order to resolve this problem, the optical fiber core wire 20 anchored therein must moved by advancing and retracting the V-shaped groove block 12 itself However, this type of apparatus is large and complicated, and in addition, takes time for assembly and adjustment, and has a high cost.

2. Because of variation in the diameter of the covered part 22, variation occurs in the image observation position. Due to this, there is the concern that it is necessary to decrease the observation magnification, and as a result, the image processing resolution decreases, that is, the precision of the splice loss estimation is caused to decrease. In particular, in the case of the high strength fusion splice of fixed polarization optical fibers, when trying to define the polarization face, even though image processing is carried out, because dislocation is large, there is the concern that the naked optical fiber is prone to become separated from the screen.

In addition, in a conventional widely-used method of fusing a naked optical fiber 24 not having a covered part 22, there is the following drawback.

3. As explained in the above 1, the face of the V-shaped groove 10 is formed of ceramic, etc. Because of this, if the naked optical fiber 24 is scratched by the V-shaped groove 10, the side face of the naked optical fiber 24 will be damaged, a crack develop, and this can easily lead to a break due to this crack developing.

In consideration of the above matter, an object of the invention of the present application is to provide a V-shaped groove block for an optical fiber that resolves the above-described problems.

SUMMARY OF THE INVENTION

The V-shaped groove block for optical fibers of the present invention that positions by aligning the axes of the naked optical fibers is characterized in that a thin layer being formed comprising a material that does not damage the naked optical fiber even when the naked optical fiber slides thereon, is provided on a surface of a V-shaped groove.

In the V-shaped groove block for an optical fiber of the present invention, because the naked optical fiber is positioned by being advanced and retracted along the V-shaped groove, it is not necessary to move the V-shaped groove block. Therefore, the structure of the apparatus is simplified, and the assembly and adjustment, etc., are simple.

According to the V-shaped groove block for an optical fiber of the present invention, even if the naked optical fiber is mounted directly on the thin layer and advanced and retracted, there is no damage to the naked optical fiber. Due to this, it is possible to prevent cracks in the naked optical fiber and these from developing into breaks. Therefore, a high strength fusion splice becomes possible.

In addition, in the V-shaped groove block for an optical fiber of the present invention, because a naked optical fiber not having a covered part is mounted directly, it is possible to prevent variation in the image observation position that is caused by the variation in the diameter of the covered part. Therefore, it is possible to prevent lowering of the precision of the splice loss estimation.

In particular, in the case of connecting fixed polarization fibers, this naked optical fiber must be turned in the V-shaped groove, and thereby the above various problems are caused. However, these can be resolved by using the V-shaped groove block for optical fiber of the present invention.

Furthermore, the V-shaped groove block for an optical fiber of the present invention has the advantage that the optical fibers are not damaged even in the case that the optical fiber are anchored by the V-shaped groove being in permanent contact with the surface of the optical fiber, even in cases other than temporary anchoring of the optical fiber, as in butt splice.

Moreover, in this Specification, a V-shaped groove block denotes a platform on which a positioning groove is formed, but the cross-section thereof need not be a v-shape, and a U-shape or other shape is possible. In addition, the V-shaped groove block of the present invention can be used of course for connecting single core optical fibers, but can also be used to connect multiple core optical fibers.

DESCRIPTION OF THE PREFERRED EMBODIMENTS

Figure 1:
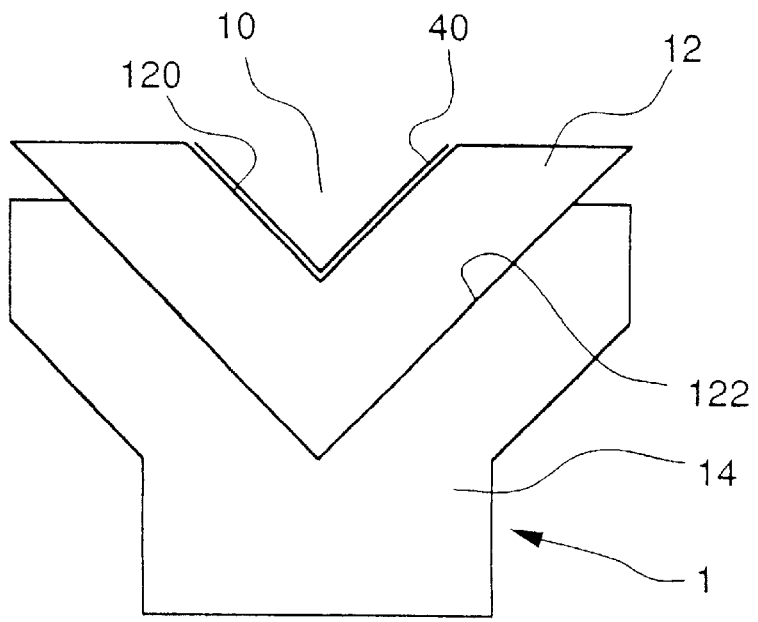
FIG. 1 is a drawings showing a V-shaped groove block for an optical fiber according to the present invention.

Below, the V-shaped groove block for optical fibers of the present invention is explained referring to FIG. 1. The V-shaped groove block 1 for optical fibers shown in FIG. 1 comprises a V-shaped groove member 12 and a V-shaped groove platform 14 on which it is installed. The V-shaped groove platform 14 has an installation face 122 formed in a V-shape and having a flatness of about 1 $\mu$m or less. This V-shaped groove member 12 is installed on this installation face 122.

The V-shaped groove member 12 comprises cold-rolled steel that can be ground with high precision, and the V-shaped groove 10 having a flatness of about 1 $\mu$m or less is formed. On the V-shaped groove face 120, a thin layer 40 is formed upon which the naked optical fibers 24 slide.

Moreover, in this present specific example, the flatness is measured according to JIS B00610.

A material that will not damage the optical fiber even when the naked glass fiber is slid thereon forms this thin film 40. In order to prevent damage to the naked optical fiber, the hardness of the part that contacts the naked optical fiber must be lower than that of the glass that is the raw material for the optical fiber. Because the optical fiber glass has a Vickers hardness of approximately 1200, the material will be less then this. However, in the case that objects of a similar hardness are rubbed together, there is a high probability that both will be damaged. In the case that the difference in hardness is about half, damage will most frequently occur to one side, and thus a Vickers hardness in the range of 300 to 600 is preferable.

A metallic plating of zinc, nickel, gold, silver, etc., or a plastic covering of fluororesin, etc. are examples of preferable materials for the thin layer 40. Among these, because the variation in thickness is small for metallic plating such as zinc, electroless nickel, silver, and gold, and Dry Loop (Trademark of Toyou Dorai Loopobu Corp.; catalog number: Teflon coating number 6100), they are more preferable. In addition, in the case that thermal fusion over a wide range is necessary, plating the surface with metal is preferable.

In addition, it is preferable that the thin layer 40 be formed of a material having a small sliding resistance (friction coefficient) with respect to the naked optical fibers 24. The naked optical fibers 24 can slide over the thin layer 40, and therefore, the positioning of the naked optical fibers can become easier and more exact. For example, the sliding resistance of the thin layer 40 with respect the naked optical fiber 24, that is, the friction coefficient, is preferably in a range of 0.3 of 0.7. In the case of a plating using electroless nickel, silver, etc. and the above dry loop, the friction coefficient in a range of 0.3 to 0.5. Among the materials given as examples, electroless nickel plating has a favorable flatness and a small variation, and therefore is particularly preferable.

The thickness of this thin layer 40 must maintain the precision of the flatness, etc., of the groove face 120 of the V-shaped groove member 12, and thus should be thin. However, considering the durability of the thin layer 40 itself, it should be thick. Considering these factors together, the thickness of the thin layer 40 is preferable in a range of 3 to 10 $\mu$m, and more preferably about 5 $\mu$m.

The V-shaped groove member 12 is preferably formed of a material that adheres well to the thin layer 40. In addition, at the same time, the material must be capable of undergoing precision formation, for example, in grinding and cutting. Specific examples include alloys containing aluminum, copper, nickel, and zinc, cold rolled steel, and in addition, precision formed resins. Among these, cold rolled steel, C 3604, A 7075, A 5052, aluminum alloy, and copper alloy are preferable. In particular, in the case that thermal fusion over a wide range is necessary, forming the V-shaped groove member 12 of a conductive material such as iron, copper, and aluminum is preferable because it will attract the electrical discharges.

Moreover, in the present specific example, the thin layer 40 is not installed directly on the installation face 122, but the thin layer 40 is provided via a V-shaped groove member 12. However, the thin layer 40 can be installed directly on the installation face 122 of the V-shaped groove platform 14.

EXPERIMENTAL EXAMPLES

Experimental Example 1

The optical fibers were connected by high strength fusion using the V-shaped groove block 1 shown in FIG. 1. The V-shaped groove member 12 shown in FIG. 1 comprises cold rolled steel, and the groove face 120 is finished with a flatness of about 1 $\mu$m or less. In addition, on the groove face 120, a nickel layer 40 having a thickness of 5 $\mu$m was formed by an electroless nickel plating method. The Vickers hardness of this nickel film 40 is 450. This V-shaped groove block 1 was connected to a high strength fusion connector. Next, a naked optical fiber 24 comprising silicon glass having a Vickers hardness of about 1200 was mounted on the V-shaped groove 10. Subsequently, naked optical fibers 24 were clamped, the naked optical fibers 24 were slid over the thin film 40 and positioned by moving the clamp, and high strength fusion splice was carried out.

Moreover, the friction coefficient of the nickel layer 40 and the naked optical fiber 24 are about 0.3. Furthermore, the fusion was carried out using a high strength fusion connector (Fujikura, K. K., product name FSM-20PMZ), at a temperature of 22° C. and a humidity of 50% in a cleaned room (class 100).

Comparative Example 1

The naked optical fiber 24 is not placed directly on the V-shaped groove block 1, but the naked optical fiber 24 is covered with nylon, and the optical fiber core wire 20 that forms the covered part 22 having a 250 micron diameter is placed in the V-shaped groove block 1. Otherwise, the high strength fusion splice is carried identically to the experimental example 1. Moreover, the friction coefficient between the thin layer 40 of the present comparative example and the covered part 22 is 0.9 or greater In the present comparative example, positioning the optical fiber core wire 20 and moving it on the thin film 40 was very difficult. Due to this, the applicants gave up positioning the optical fiber core wire 20 and moving it on the V-shaped groove block 1, and positioned the naked optical fiber 24 by moving the groove block 1 itself Since this apparatus was large and complicated, assembly and adjustment took an extreme amount of time and labor.

Comparative Example 2

A V-shaped groove block 1 that did not have the thin layer 40 provided on the V-shaped groove 10 was used. Otherwise, the high strength fusion splice of the naked optical fiber 24 is carried identically to the experimental example 1.

Figure 2:
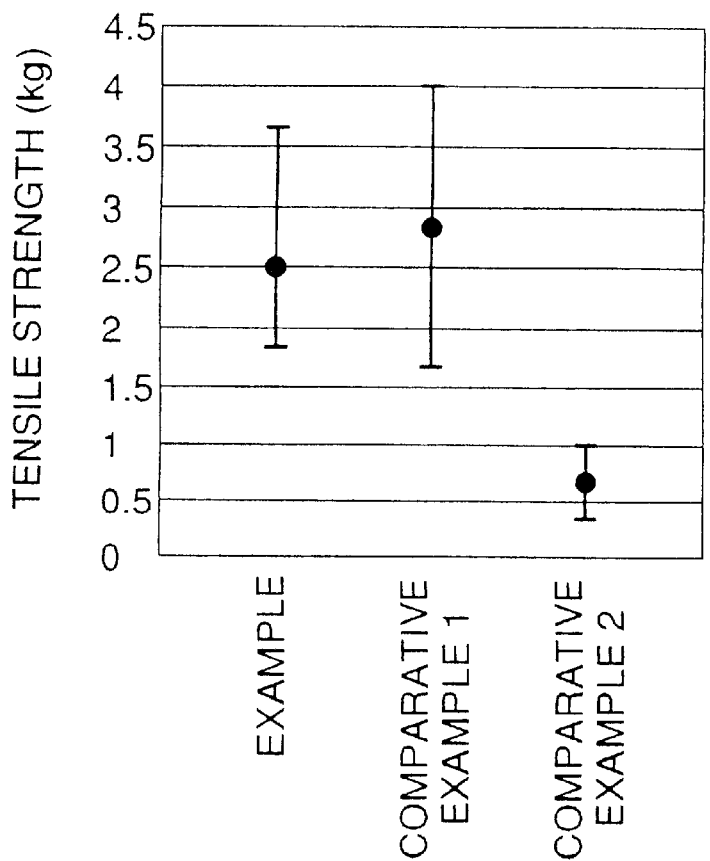
FIG. 2 shows the tensile strength of the optical fiber after the optical fiber fusion splice.
Figure 3:
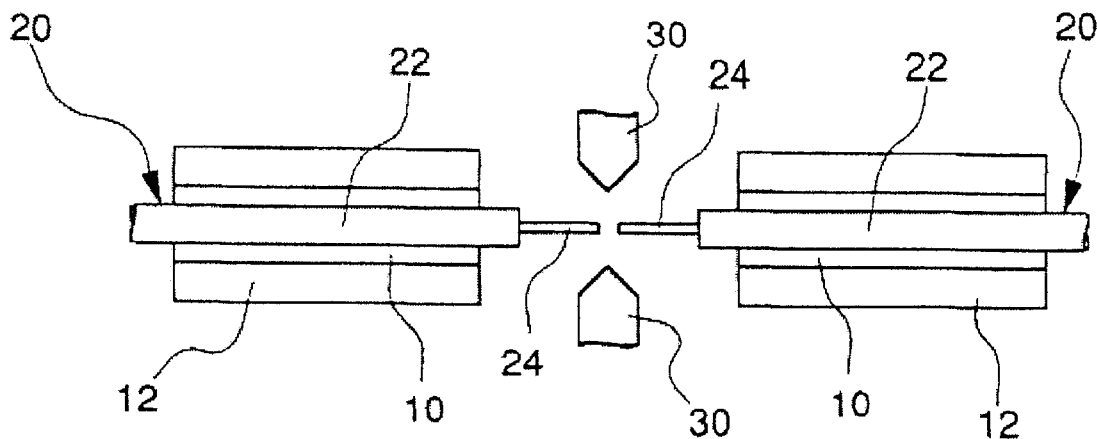
FIG. 3 is a drawing of a planar view for explaining a conventional high strength fusion splice method.
Figure 4:
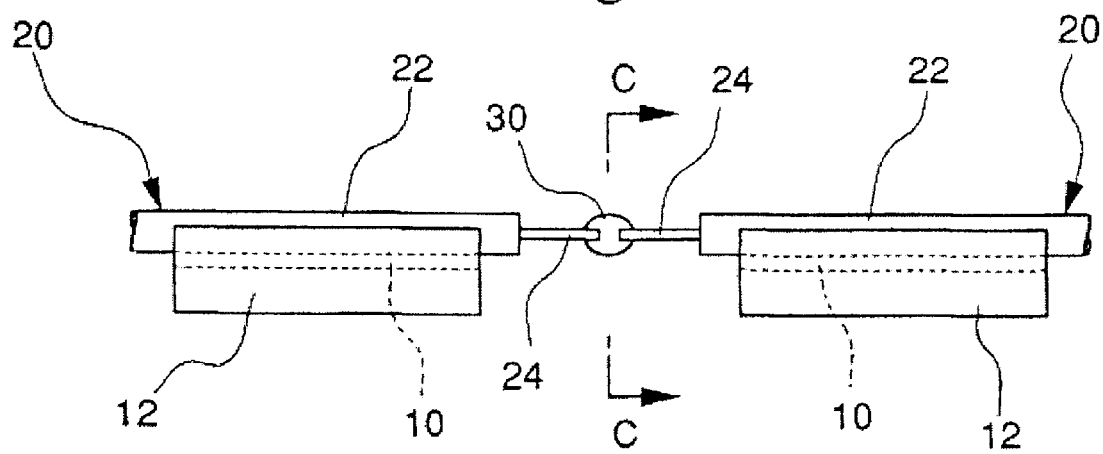
FIG. 4 is a drawing of a side view for explaining a conventional high strength fusion splice method.
Figure 5:
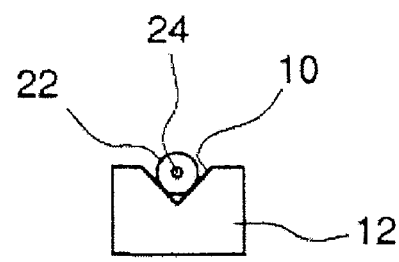
FIG. 5 is a drawing showing the V-shaped groove block and the optical fiber core wire when cut across the line C—C in FIG. 4.

The tensile strength test of the connected optical fibers obtained in experimental example 1 and comparative examples 1 and 2 was carried out using a tensile strength tester FSR01 (Fujikura Corp.) The obtained strength distribution is shown in FIG. 2.

Comparing the experimental results of experimental example 1 and comparative example 1, it can be understood that the connect optical fibers obtained in experimental example 1 have a tensile strength of the same degree as the connected optical fiber obtained in comparative example 1. Therefore, it is clear that using the V-shaped groove block for optical fibers of the present experimental example, high strength splice is possible. Moreover, according to the V-shaped groove block for optical fibers of the present experimental example, because the naked optical fiber can be positioned easily without moving the V-shaped groove block 1, the structure of the apparatus is simple.

In addition, comparing the experimental results of experimental example 1 and comparative example 2, it is clear that the splice strength of the connected optical fiber in experimental example 1 is superior to the connected optical fiber in comparative example 2.

What is claimed is:

1. A V-shaped groove block for optical fibers for aligning and positioning the axis of naked optical fibers, wherein a thin film comprising a material that does not damage the naked optical fibers even when they are slid thereon, is provided on a surface of a V-shaped groove.

2. A V-shaped groove block for optical fibers according to claim 1 wherein said thin film is formed by metal plating said V-shaped groove face.

3. A V-shaped groove block for optical fibers according to claim 2 wherein said thin film is a zinc, nickel, silver, or gold.

4. A V-shaped groove block for optical fibers according to claim 2 wherein the thickness of said thin film is in the range of 3 to 10 $\mu$m.

5. A V-shaped groove block for optical fibers according to claim 2 wherein the Vickers hardness of said thin film is in the range of 300 to 600.

6. A V-shaped groove block for optical fibers according to claim 1 wherein said V-shaped groove block comprises a V-shaped groove platform and a V-shaped groove member comprising said V-shaped groove and being installed in the V-shaped groove platform, said thin film is provided on the surface of the V-shaped groove.

7. A V-shaped groove block for optical fibers according to claim 6 wherein said V-shaped shaped groove member comprises a conductive material.

8. A V-shaped groove block for optical fiber according to claim 1 wherein the friction coefficient of said thin film and naked optical fiber is in a range of 0.3 to 0.7.

* * * * *